Nov. 17, 1931.  G. F. MEEHAN  1,832,037
FISH LURE
Filed Nov. 7, 1927
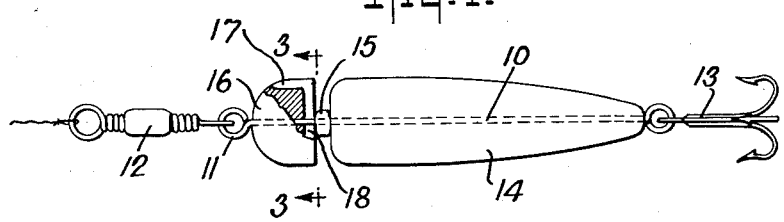
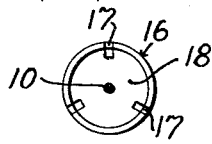
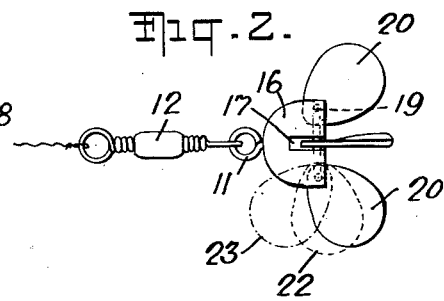
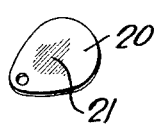
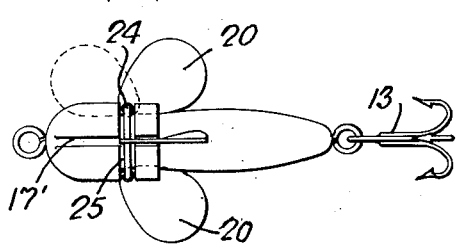
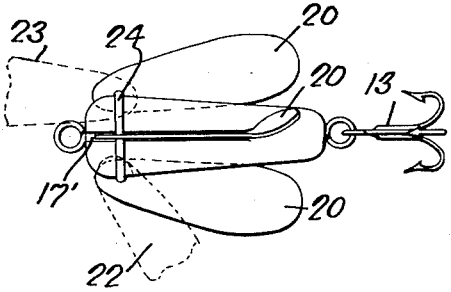
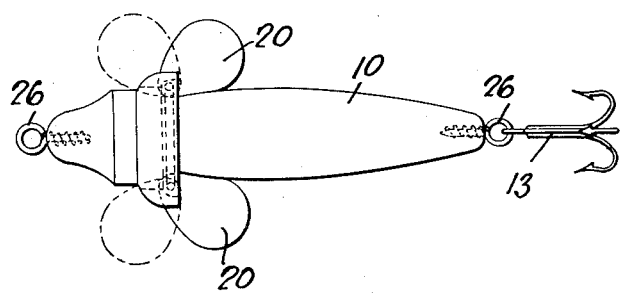
INVENTOR.
George F. Meehan
BY
Mayer, Warfield & Watson
ATTORNEYS.

Patented Nov. 17, 1931

1,832,037

UNITED STATES PATENT OFFICE

GEORGE F. MEEHAN, OF NEW YORK, N. Y.

FISH LURE

Application filed November 7, 1927. Serial No. 231,404.

This invention relates to fish lures, and more particularly, to artificial baits used in trolling or spinning, and has as a general object the provision of such devices which may be manufactured at small cost, which are attractive in appearance, and which may be used with a minimum of difficulty, even in waters which are weedy and normally would entangle baits of this type.

A more specific object of the invention is to provide an artificial bait of the plug type which is so constructed as to allow of varying the method of trolling the same to simulate a spinner, and, at the will of the operator, to simulate the swimming action of insects or the like.

Others objects of the invention will in part be obvious and in part will appear hereinafter.

The invention accordingly comprises an article of manufacture possessing the features, properties and the relation of elements which will be exemplified in the article hereinafter described, and the scope of the application of which will be indicated in the claims.

For a fuller understanding of the nature and objects of the invention reference should be had to the following detailed description taken in connection with the accompanying drawings, in which:

Figure 1 is a side elevational view of one form of the device with the squids or spinners removed;

Fig. 2 is a similar view of the front end of the form shown in Fig. 1, showing the spinners in position;

Fig. 3 is a transverse sectional view taken on the line 3—3 of Fig. 1;

Fig. 4 is a perspective view of one of the spinners; and

Figs. 5, 6 and 7 are side elevational views of other embodiments of the invention.

The embodiment in Figs. 1 to 4 inclusive of the drawings comprises an elongated stem 10 formed of wire or the like, which is looped at the front end as at 11 for receiving the line on a swivel 12 and is similarly looped at the rear to receive a hook or hook gang 13. Mounted on the stem 10 is a main body-portion 14, which may be either fixed or rotatably mounted with respect to the stem, and which may be colored in any manner desired to render it attractive to fish. In advance of the forward end of the body 14, and preferably spaced therefrom, as by a washer 15, is another body-portion comprising a rotatable head 16. The over-all length of the head, washer and body-portions are so proportioned with respect to the stem 10 that the space between the loops 11 is substantially filled. The rotating-head 16 likewise may be colored in any desired manner and bears radial grooves or slots 17, and has its rear face undercut as at 18 to receive an expanding-ring 19. Positioned within the radial grooves 17, and pivotally secured on the expanding-ring 19, is a series of squids or spinners 20. These squids may be made in substantially any size or shape, but preferably are proportioned to the over-all dimensions of the plug and may be made from mother-of-pearl, although other desired material may be used without departing from the spirit of the invention.

As shown in Figs. 2 and 4 to 7, the squids 20 are curved as at 21, and are so mounted with respect to the radial grooves 17 that when the device is drawn through the water at a regular speed the squids are forced upwardly by the centrifugal force of the spinning and the action of the water on the curved surfaces thereof until they assume a position approximating that shown in dotted lines 22 in Fig. 2. However, if the manner of trolling is varied, so that the speed is non-uniform or intermittent, the squids will tend to oscillate through an approximately obtuse angle between the full line position and the dash-line position 23 in Fig. 2. This action will simulate the swimming action of an insect or the like in a very effective manner, and, at the same time, the plug will continue to be rotated to a certain extent, thus giving a combined effect. Another function of this combined action of the squids is to facilitate disentanglement of the device from weeds, brush or the like.

In the embodiment shown in Figs. 5 and 6, the same principle is involved, except that the squids are retained by an external clamping ring 24, which may wholly or partially lie within a circumferential groove 25. Also, in these forms, owing to the use of the external ring, and to the head and body being integral, the radial grooves 17' are increased in length, extending both forwardly and rearwardly from the ring 24.

In Fig. 7 is shown a modification which is somewhat intermediate of that of Fig. 1 and those of Figs. 5 and 6 in that, although the internally-expanding ring is used for retaining the squids in position, nevertheless, the body is fixed with respect to the head. Also, as shown in this modification, the stem 10 may be interrupted, and the line, swivel and hooks are attached to the plug by means of eye-screws 26. In such case, as will be readily understood, the swivel 12, or an equivalent thereof, should be preferably used in order that the device may rotate freely.

These and other modifications will be readily apparent to one skilled in the art, and since certain changes may be made in the above article, and different embodiments of the invention could be made, without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. An artificial bait, comprising a body having a longitudinally-extending radial groove, a squid-member, and means for pivotally retaining the forward end of the squid-member intermediate the ends of the groove in a manner such that the squid-member may lie partially within or swing outwardly at least to approximately right angles to said body.

2. An artificial bait, comprising a body having a plurality of longitudinally-extending radial grooves, a plurality of squid-members, and means for pivotally retaining the forward end of each of the squid-members intermediate the ends of each groove.

3. An artificial bait, comprising a body having a plurality of longitudinally-extending radial grooves, and a pivotally mounted squid-member arranged to seat in each of said grooves and intermediate the ends thereof whereby said squid-members may lie partially within or swing outwardly at least to approximately right angles to said body.

4. An artificial bait, comprising a stem, an elongated body-portion mounted thereon, a head-portion carried by said stem and having radial grooves adjacent the rear edge thereof, a plurality of squid-members, and means carried by said head for pivotally retaining the forward end of each of the squid-members intermediate the ends of each groove.

5. An artificial bait, comprising a stem, an elongated body-portion mounted thereon, a head-portion carried by said stem and having radial grooves adjacent the rear edge thereof and being spaced from said body-portion, said head-portion having a recess in its rear face, a ring seated in said recess and traversing said grooves, and a plurality of squids mounted upon said ring, one of said squids being pivotally retained in each of said grooves by said ring.

6. An artificial bait, comprising a stem, an elongated body-portion mounted thereon, a head-portion rotatively carried by said stem and having radial grooves adjacent the rear edge thereof, a plurality of squid-members, and means carried by said head for pivotally retaining the forward end of each of the squid-members intermediate the ends of each groove.

7. An artificial bait, comprising a body-portion having a plurality of longitudinally-extending radial grooves adjacent one end thereof, a transverse groove formed in the outer surface of said body portion and said radial grooves, a ring-member mounted in said transverse groove, and a plurality of squid-members pivotally mounted on said ring-member, one of each of said squid-members being arranged to seat in one of said grooves whereby said squid-members may lie partially within or swing outwardly at least to approximately right angles to said body said squid-members being free to move from the slots outwardly at least to approximately right angles to said body.

8. An artificial bait, comprising an elongated body-portion having a plurality of longitudinally-extending radial grooves adjacent one end thereof, an externally-disposed transverse groove intersecting said radial grooves, a ring-member mounted in said transverse groove, and a plurality of squid-members pivotally mounted on said ring-member, one of each of said squid-members being arranged to seat in each of said grooves whereby said squid-members may lie partially within or swing outwardly at least to approximately right angles to said body.

9. An artificial bait comprising a body portion formed with a plurality of longitudinally extending radial grooves in its outer surface, a squid-member corresponding to each groove, and means to pivotally mount said squid members intermediate the ends of said grooves, the inner surface of the grooves lying within the pivotal axes, whereby opposite edges of each squid-member may seat in either one of said grooves at either end of the mounting means.

10. An artificial bait comprising a body portion, a plurality of squid-members and means to pivotally mount said squid-members intermediate the ends of the body portion, said body portion being free from obstructions in line with the pivotal axes so that the rear or front edge of each squid member may be substantially aligned with the axis of the body portion when the squid-member is swung rearwardly or forwardly, respectively.

In testimony whereof I affix my signature.
GEORGE F. MEEHAN.